(12) United States Patent
Hu et al.

(10) Patent No.: US 12,279,032 B2
(45) Date of Patent: Apr. 15, 2025

(54) OPTICAL MECHANISM

(71) Applicant: TDK TAIWAN CORP., Taoyuan (TW)

(72) Inventors: Chao-Chang Hu, Taoyuan (TW); Chen-Hsien Fan, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 245 days.

(21) Appl. No.: 17/974,955

(22) Filed: Oct. 27, 2022

(65) Prior Publication Data

US 2023/0038826 A1 Feb. 9, 2023

Related U.S. Application Data

(63) Continuation of application No. 17/113,786, filed on Dec. 7, 2020, now Pat. No. 11,509,801, which is a
(Continued)

(30) Foreign Application Priority Data

May 8, 2018 (CN) .......................... 201810431696.1

(51) Int. Cl.
| | |
|---|---|
| *H04N 23/55* | (2023.01) |
| *G02B 13/00* | (2006.01) |
| *G03B 5/02* | (2021.01) |
| *G03B 13/36* | (2021.01) |
| *H04N 23/54* | (2023.01) |

(Continued)

(52) U.S. Cl.
CPC ......... *H04N 23/55* (2023.01); *G02B 13/0065* (2013.01); *G03B 5/02* (2013.01); *G03B 13/36* (2013.01); *H04N 23/54* (2023.01); *H04N 23/57* (2023.01); *H04N 23/687* (2023.01); *G03B 2205/0069* (2013.01)

(58) Field of Classification Search
None
See application file for complete search history.

(56) References Cited

U.S. PATENT DOCUMENTS

| | | |
|---|---|---|
| 9,151,665 B1 | 10/2015 | Lewkow et al. |
| 9,794,459 B1 | 10/2017 | Kim et al. |
| (Continued) | | |

FOREIGN PATENT DOCUMENTS

| | | |
|---|---|---|
| CN | 1755507 A | 4/2006 |
| CN | 103809263 A | 5/2014 |

OTHER PUBLICATIONS

Office Action mailed Oct. 15, 2021 in CN Application No. 201810431696.1 is attached, 9 pages.

*Primary Examiner* — Paul M Berardesca
(74) *Attorney, Agent, or Firm* — MUNCY, GEISSLER, OLDS & LOWE P.C

(57) ABSTRACT

An optical mechanism is provided, including an optical member, a fixed portion, and a holder. The optical member has a first optical lens and a second optical lens, wherein the first and second optical lenses define an optical axis, and the first optical lens is larger than the second optical lens. The holder is movably connected to the fixed portion and configured to support the optical member, wherein the holder has an end surface facing the first optical lens, and the end surface is not parallel to the optical axis.

20 Claims, 13 Drawing Sheets

Related U.S. Application Data continuation of application No. 15/977,427, filed on May 11, 2018, now Pat. No. 10,887,498.

(60) Provisional application No. 62/505,420, filed on May 12, 2017.

(51) Int. Cl.
*H04N 23/57* (2023.01)
*H04N 23/68* (2023.01)

(56) References Cited

U.S. PATENT DOCUMENTS

| | | | |
|---|---|---|---|
| 10,274,812 B1 * | 4/2019 | Chen | H04N 23/55 |
| 2015/0271372 A1 | 9/2015 | Sekimoto et al. | |
| 2018/0109660 A1 | 4/2018 | Yoon et al. | |
| 2018/0259787 A1 | 9/2018 | Kim et al. | |
| 2018/0356645 A1 | 12/2018 | Jeong et al. | |
| 2018/0364441 A1 | 12/2018 | Hubert et al. | |
| 2019/0004328 A1 | 1/2019 | Lee et al. | |
| 2019/0137724 A1 * | 5/2019 | Kim | G02B 7/02 |
| 2019/0227199 A1 | 7/2019 | Kao et al. | |
| 2019/0235202 A1 | 8/2019 | Smyth et al. | |
| 2019/0310438 A1 * | 10/2019 | Komiyama | G02B 7/02 |
| 2019/0369369 A1 | 12/2019 | Shabtay et al. | |
| 2019/0377155 A1 | 12/2019 | Bachar et al. | |
| 2020/0004007 A1 | 1/2020 | Li et al. | |

* cited by examiner

OPTICAL MECHANISM

CROSS REFERENCE TO RELATED APPLICATIONS

This application is a continuation application of U.S. patent application Ser. No. 17/113,786, filed Dec. 7, 2020, which is a continuation application of U.S. patent application Ser. No. 15/977,427, filed May 11, 2018, which claims the priority of U.S. Provisional Application No. 62/505,420, filed May 12, 2017, and China Patent Application No. 201810431696.1, filed May 8, 2018, the entirety of which are incorporated by reference herein.

BACKGROUND OF THE INVENTION

Field of the Invention

The application relates in general to an optical mechanism, and in particular, to an optical mechanism having a driving module.

Description of the Related Art

As technology has advanced, a lot of electronic devices (such as digital cameras and smartphones) have been given the functionality of taking photographs and recording video. These electronic devices have become more commonplace, and have been developed to be more convenient and thin. More and more choices are provided for users to choose from.

Some electronic devices able to take photographs or record video include a lens driving module to drive an optical member to move, so as to facilitate auto-focus control and optical image stabilization (OIS). The light can pass through the lens and form an image on an image sensor.

However, the lens driving module usually comprises a plurality of magnets and a plurality of coils surrounding the optical member, so that the dimensions of the lens driving module and the electronic device cannot be reduced. Therefore, how to address the aforementioned problem has become an important issue.

BRIEF SUMMARY OF INVENTION

To address the deficiencies of conventional products, an embodiment of the invention provides an optical mechanism. The optical mechanism includes an optical member, a fixed portion, and a holder. The optical member has a first optical lens and a second optical lens, wherein the first and second optical lenses define an optical axis, and the first optical lens is larger than the second optical lens. The holder is movably connected to the fixed portion and configured to support the optical member, wherein the holder has an end surface facing the first optical lens, and the end surface is not parallel to the optical axis.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the optical member driving mechanism (optical mechanism) and the camera device having the optical member driving mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
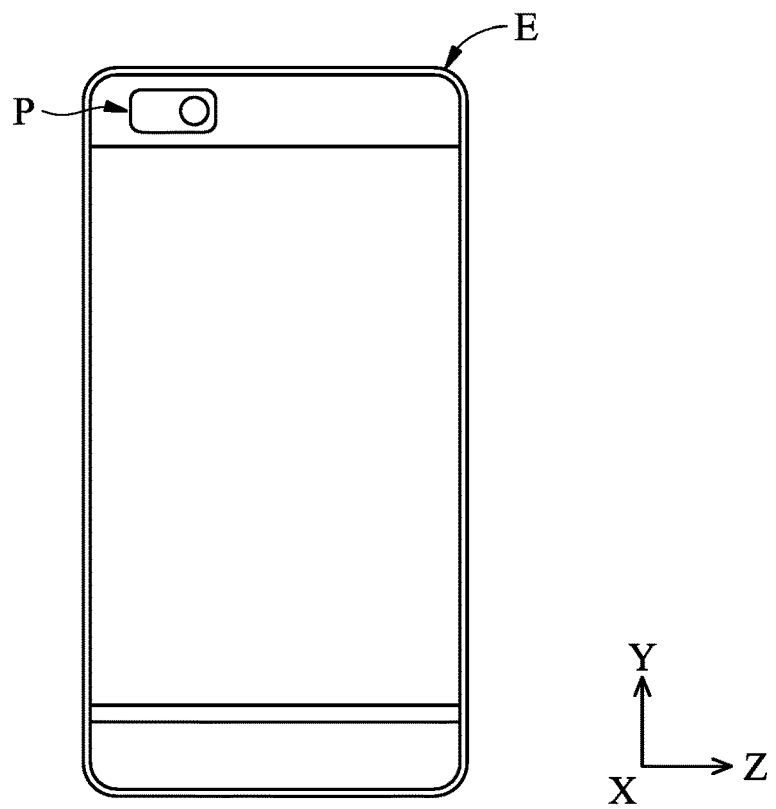
FIG. 1 is a schematic diagram of an electronic device according to an embodiment of the invention.

Referring to FIG. 1, in an embodiment of the invention, the camera device P can be disposed in an electronic device E and used to take photographs or record video. The electronic device E can be a smartphone or a digital camera, for example. When taking photographs or recording video, the camera device P can receive the light and form an image, wherein the image can be transmitted to a processor (not shown) in the electronic device E, where post-processing of the image can be performed.

Figure 2:
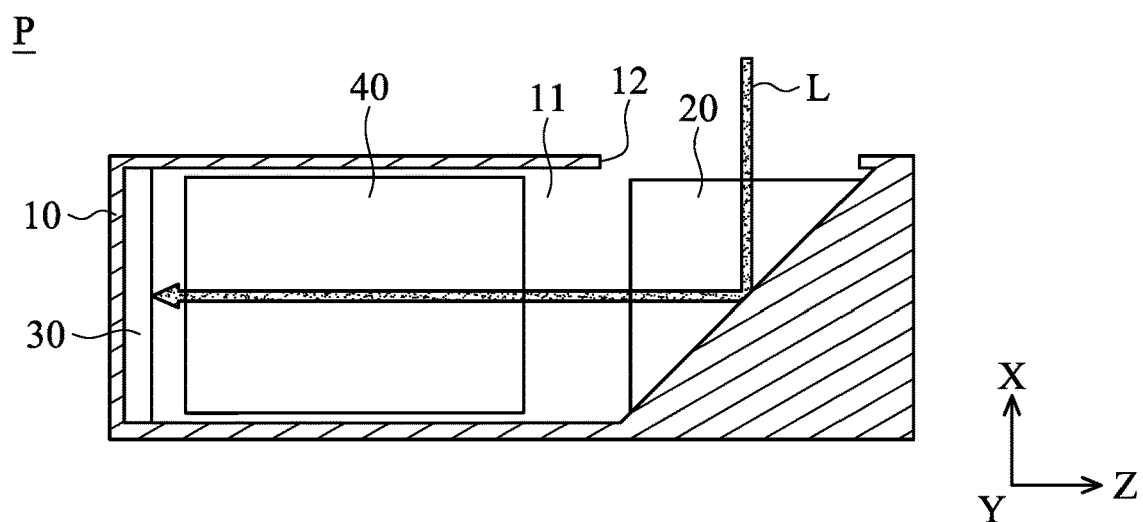
FIG. 2 is a schematic diagram of a camera device according to an embodiment of the invention.

Referring to FIG. 2, the camera device P comprises a housing 10, a prism 20, an image sensor 30, and an optical member driving mechanism 40 (optical mechanism). The housing 10 has an accommodating space 11 and an opening 12 communicating with the accommodating space 11, wherein the opening 12 is formed on the wall of the housing 10. The prism 20, the image sensor 30 and the optical member driving mechanism 40 are disposed in the accommodating space 11. The optical member driving mechanism 40 is disposed between the prism 20 and the image sensor 30, and the opening 12 is adjacent to the prism 20. Furthermore, the optical member driving mechanism 40 can support at least one optical member (such as an optical member O shown in FIG. 3 or an optical member O' shown in FIGS. 7A and 7B).

As shown in FIG. 2, the external light L can pass through the opening 12 in a first direction (along X-axis) and enter the accommodating space 11 of the camera device P, and be reflected by the prism 20. The reflected external light L can pass through the optical member on the optical member driving mechanism 40 in a second direction (along Z-axis) and reach the image sensor 30. When the image sensor 30 catches the external light L, an image can be formed on the image sensor 30.

Figure 3:
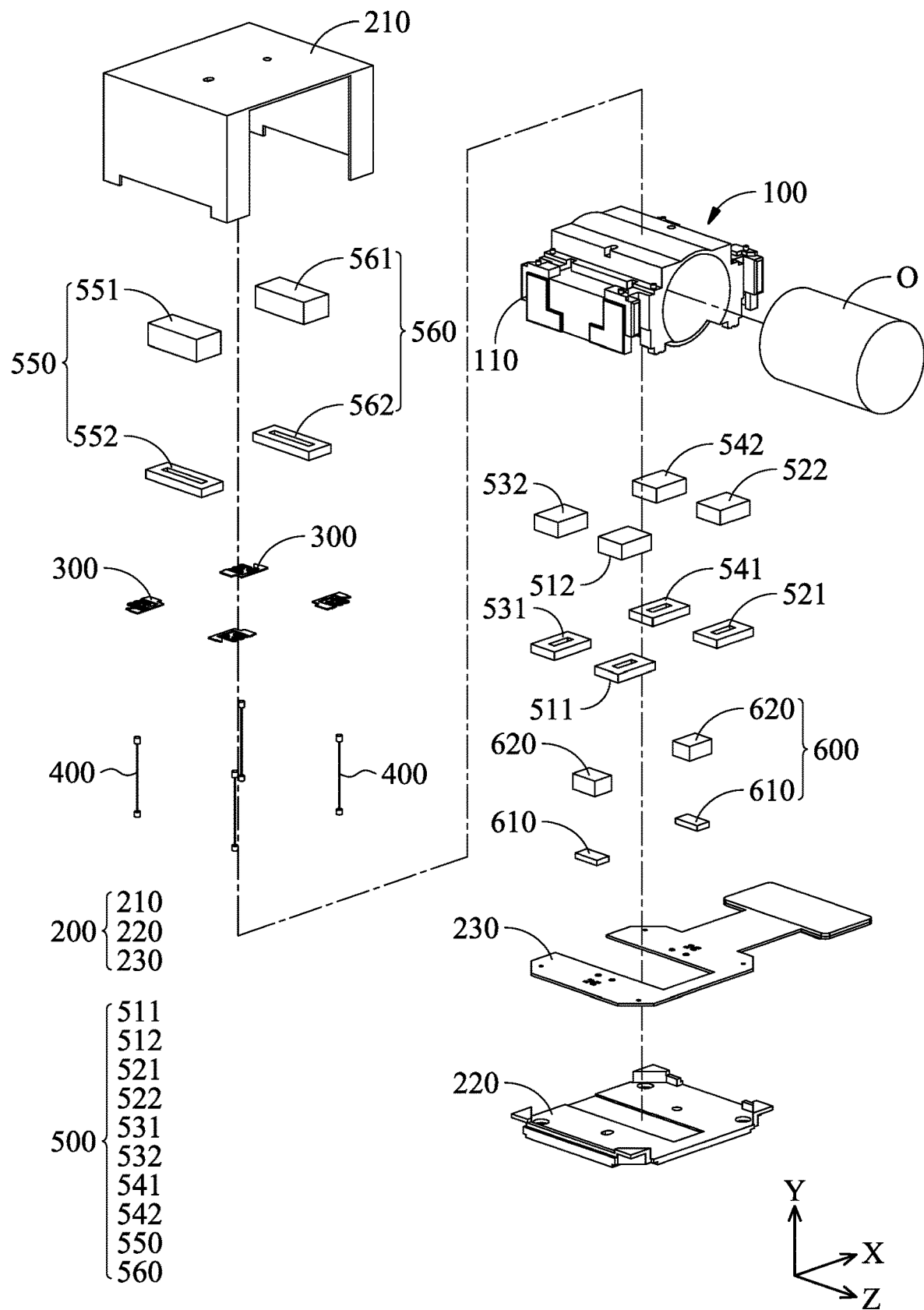
FIG. 3 is an exploded-view diagram of an optical member driving mechanism (optical mechanism) according to an embodiment of the invention.

FIG. 3 is an exploded-view diagram of the optical member driving mechanism 40 and the optical member O disposed thereon according to an embodiment of the invention. As shown in FIG. 3, the optical member driving mechanism 40 primarily comprises a movable portion 100, a fixed portion 200, a plurality of elastic members 300 (connection elements), a plurality of suspension wires 400 (connection members), a driving module 500, and two position-detecting assemblies 600.

The movable portion 100 can comprise a holder 110 for supporting the optical member O. The fixed portion 200 can comprise a top cover 210, a lower cover 220, and a circuit board 230, wherein the top cover 210 and the lower cover 220 can be assembled to form a hollow box, and the circuit board 230 can be disposed on the lower cover 220. The elastic members 300 are connected to the hollow box and the holder 110, so as to hang the holder 110 in the hollow box. When viewed along the first direction (Y-axis), the elastic members 300 are located at different corners of the lower cover. The suspension wires 400 are connected to the circuit board 230 and the elastic members 300. Since both the elastic members 300 and the suspension wires 400 comprise metal (such as copper or an alloy thereof), they can be used as a conductor. For example, the circuit board 230 can provide current to the driving module 500 through the suspension wires 400 and the elastic members 300.

The specific structures of the driving module 500 and the position-detecting assembly 600 are discussed below. It should be noted that, FIGS. 4A-4E merely shows the relative positions between the optical member O, the driving module 500, the position-detecting assembly 600, and/or the image sensor 30 for ease understanding, the other members are omitted.

Figure 4A:
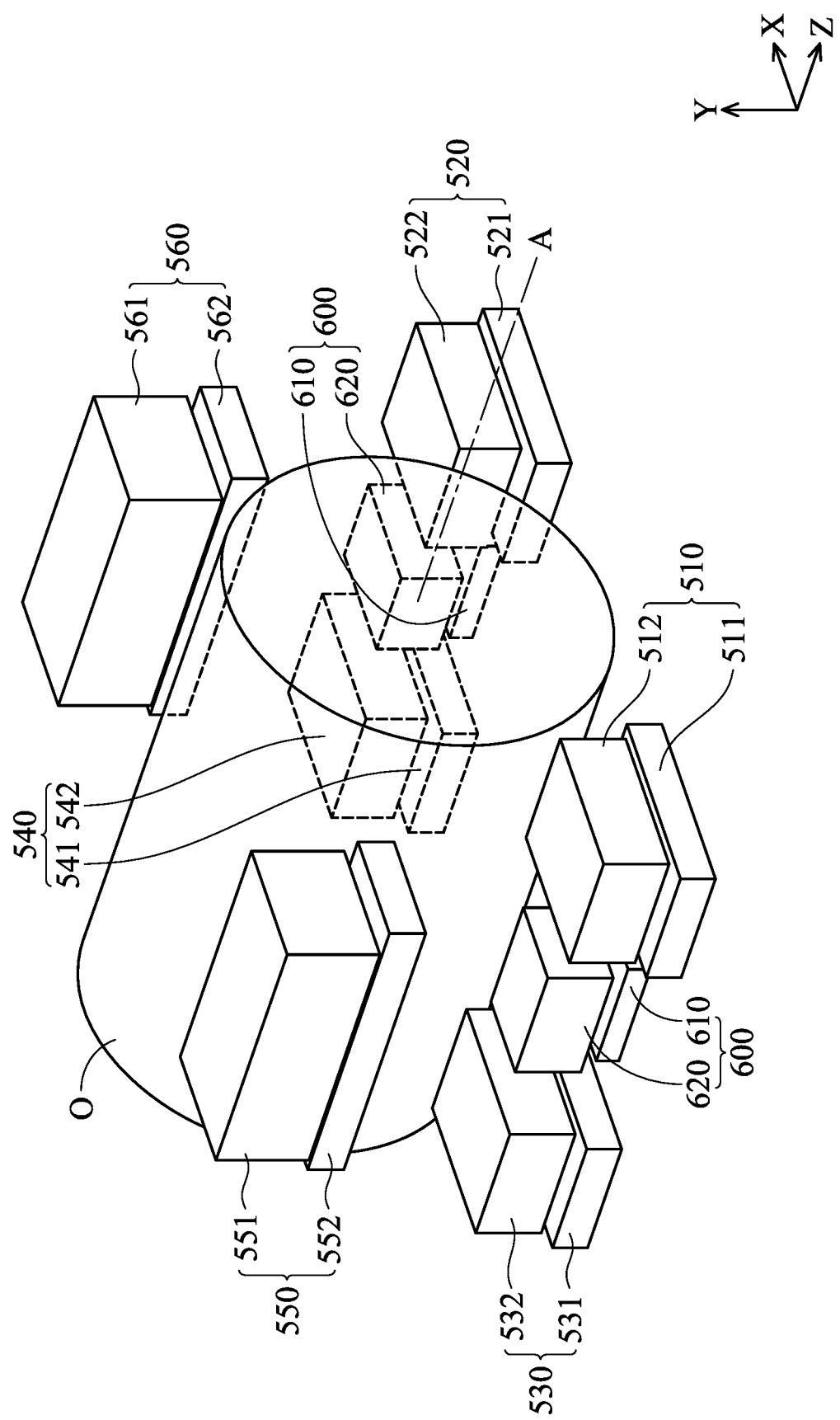
FIG. 4A is a schematic diagram of an optical member, a driving module, and a position-detecting assembly according to an embodiment of the invention.
Figure 4B:
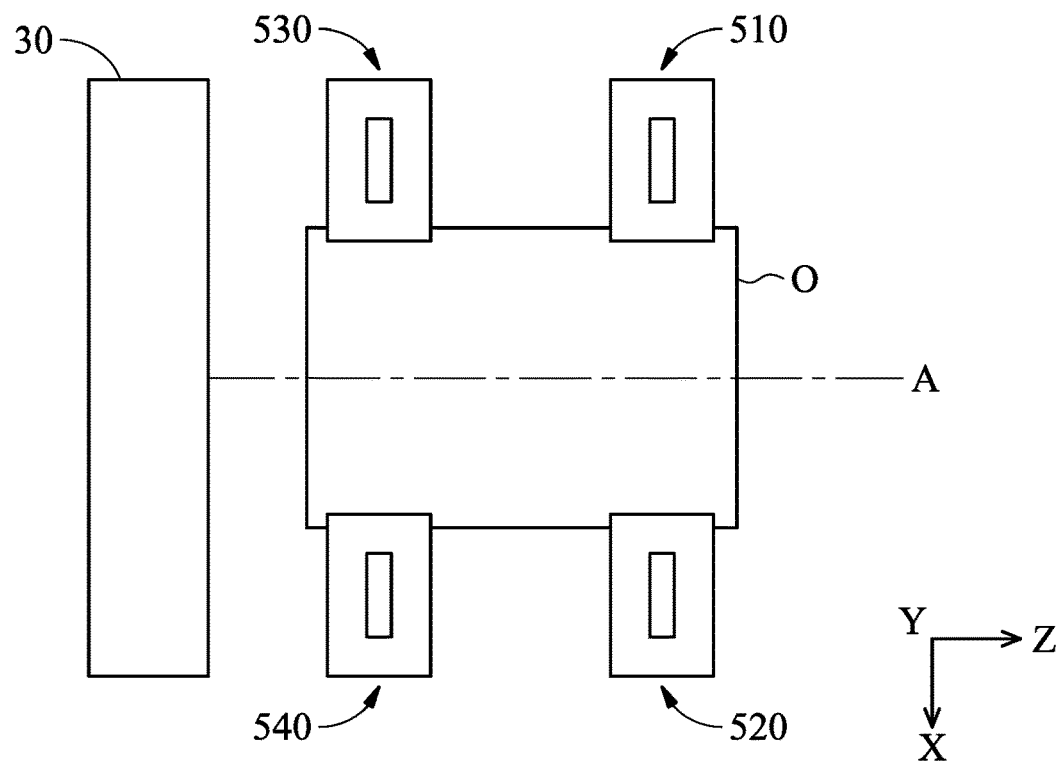
FIG. 4B is a schematic diagram of the optical member, the driving module, and an image sensor according to an embodiment of the invention.

Referring to FIGS. 3 and 4A, in this embodiment, the driving module 500 comprises a first electromagnetic driving assembly 510, a second electromagnetic driving assembly 520, a third electromagnetic driving assembly 530, a fourth electromagnetic driving assembly 540, a fifth electromagnetic driving assembly 550, and a sixth electromagnetic driving assembly 560.

In X-axis, the first, third, and fifth electromagnetic driving assemblies 510, 530 and 550 are disposed on a side of the optical member O, and the second, fourth, and sixth electromagnetic driving assemblies 520, 540 and 560 are disposed on the other side. In other words, an optical axis A of the optical member O is disposed between the first electromagnetic driving assembly 510 and the second electromagnetic driving assembly 520, between the third electromagnetic driving assembly 530 and the fourth electromagnetic driving assembly 540, and between the fifth electromagnetic driving assembly 550 and the sixth electromagnetic driving assembly 560.

The first electromagnetic driving assembly 510 comprises a first electromagnetic driving component 511 and a first electromagnetic driving member 512, respectively affixed to the circuit board 230 and the holder 110. For example, the first electromagnetic driving component 511 can be a driving coil, and the first electromagnetic driving member 512 can be a magnetic member. The line of magnetic force in the first electromagnetic driving member 512 is parallel to the optical axis A of the optical member O. Therefore, when current flows through the first electromagnetic driving component 511, electromagnetic effect generated between the first electromagnetic driving component 511 and the first electromagnetic driving member 512 can provide a driving force, which is parallel to the optical axis A, to drive the first electromagnetic driving member 512 to move relative to the first electromagnetic driving component 511.

The second electromagnetic driving assembly 520 comprises a second electromagnetic driving component 521 and a second electromagnetic driving member 522, respectively affixed to the circuit board 230 and the holder 110. For example, the second electromagnetic driving component 521 can be a driving coil, and the second electromagnetic driving member 522 can be a magnetic member. The line of magnetic force in the second electromagnetic driving member 522 is parallel to the optical axis A of the optical member O. Therefore, when current flows through the second electromagnetic driving component 521, electromagnetic effect generated between the second electromagnetic driving component 521 and the second electromagnetic driving member 522 can provide a driving force, which is parallel to the optical axis A, to drive the second electromagnetic driving member 522 to move relative to the second electromagnetic driving component 521.

It should be noted that, in this embodiment, the first electromagnetic driving assembly 510 and the second electromagnetic driving assembly 520 are electrically independent. Thus, the same or different currents can supply to the first electromagnetic driving member 512 and the second electromagnetic driving member 522.

Referring to FIGS. 3 and 4A, the third electromagnetic driving assembly 530 comprises a third electromagnetic driving component 531 and a third electromagnetic driving member 532, respectively affixed to the circuit board 230 and the holder 110. For example, the third electromagnetic driving component 531 can be a driving coil, and the third electromagnetic driving member 532 can be a magnetic member. The line of magnetic force in the third electromagnetic driving member 532 is parallel to the optical axis A of the optical member O. Therefore, when current flows through the third electromagnetic driving component 531, electromagnetic effect generated between the third electromagnetic driving component 531 and the third electromagnetic driving member 532 can provide a driving force, which is parallel to the optical axis A, to drive the third electromagnetic driving member 532 to move relative to the third electromagnetic driving component 531.

In this embodiment, the third electromagnetic driving component 531 is electrically connected to the first electromagnetic driving component 511, and the connecting line between the center of the first electromagnetic driving assembly 510 and the center of the third electromagnetic driving assembly 530 is substantially parallel to the optical axis A of the optical member O. Furthermore, the line of magnetic force in the third electromagnetic driving member 532 is opposite to the line of magnetic force in the first electromagnetic driving member 512, so as to prevent the interference therebetween.

The fourth electromagnetic driving assembly 540 comprises a fourth electromagnetic driving component 541 and a fourth electromagnetic driving member 542, respectively affixed to the circuit board 230 and the holder 110. For example, the fourth electromagnetic driving component 541 can be a driving coil, and the fourth electromagnetic driving member 542 can be a magnetic member. The line of magnetic force in the fourth electromagnetic driving member 542 is parallel to the optical axis A of the optical member O. Therefore, when current flows through the fourth electromagnetic driving component 541, electromagnetic effect generated between the fourth electromagnetic driving component 541 and the fourth electromagnetic driving member 542 can provide a driving force, which is parallel to the optical axis A, to drive the fourth electromagnetic driving member 542 to move relative to the fourth electromagnetic driving component 541.

Similarly, the fourth electromagnetic driving component 541 is electrically connected to the second electromagnetic driving component 521, and the connecting line between the center of the second electromagnetic driving assembly 520 and the center of the fourth electromagnetic driving assembly 540 is substantially parallel to the optical axis A of the optical member O. The line of magnetic force in the fourth electromagnetic driving member 542 is opposite to the line of magnetic force in the second electromagnetic driving member 522, so as to prevent the interference therebetween It should be noted that, since the first, second, third, and fourth electromagnetic driving components 511, 521, 531 and 541 are affixed to the fixed portion 200, and the first, second, third, and fourth electromagnetic driving members 512, 522, 532 and 542 are affixed to the movable portion 100, when electromagnetic effect is generated between the electromagnetic driving components and the electromagnetic driving members, the movable portion 100 can simultaneously move relative to the fixed portion 200.

Figure 4C:
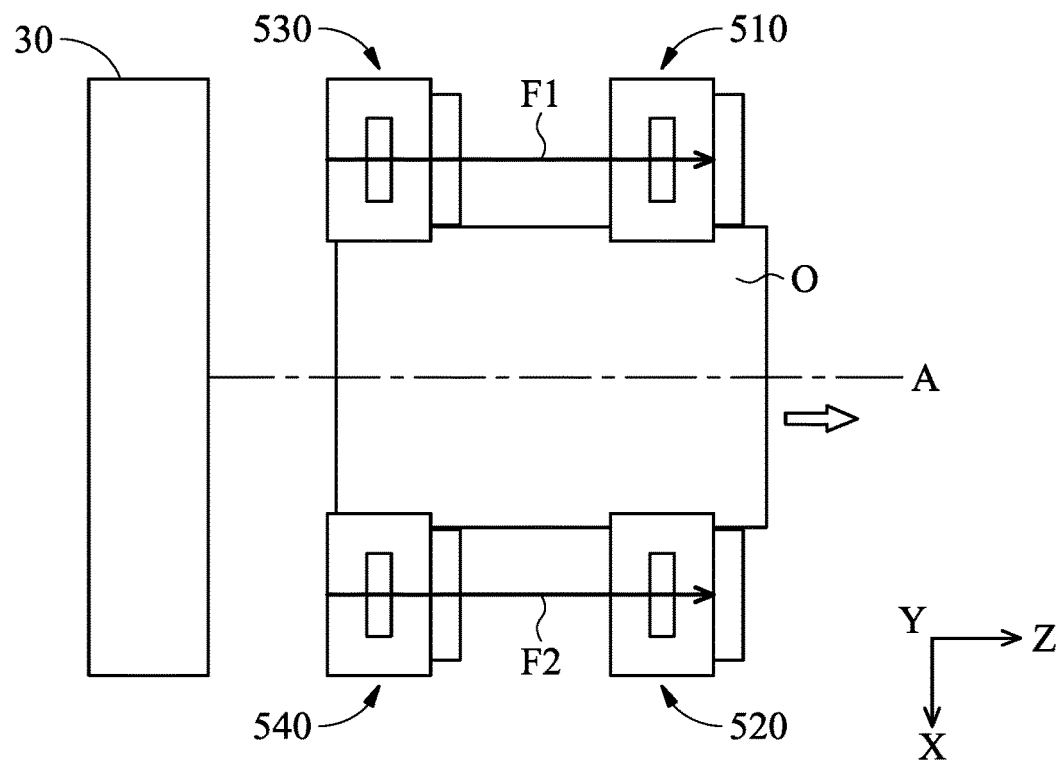
FIG. 4C is a schematic diagram representing the driving module driving the optical member to move relative to the image sensor according to an embodiment of the invention.

Referring to FIG. 4C, when the driving force F1 provided by the first and third electromagnetic driving assemblies 510 and 530 is the same as the driving force F2 provided by the second and fourth electromagnetic driving assemblies 520 and 540, the movable portion 100 and the optical member O can move relative to the fixed portion 100 and the image sensor 30 along Z-axis, so as to achieve the purpose of focus adjustment.

Figure 4D:
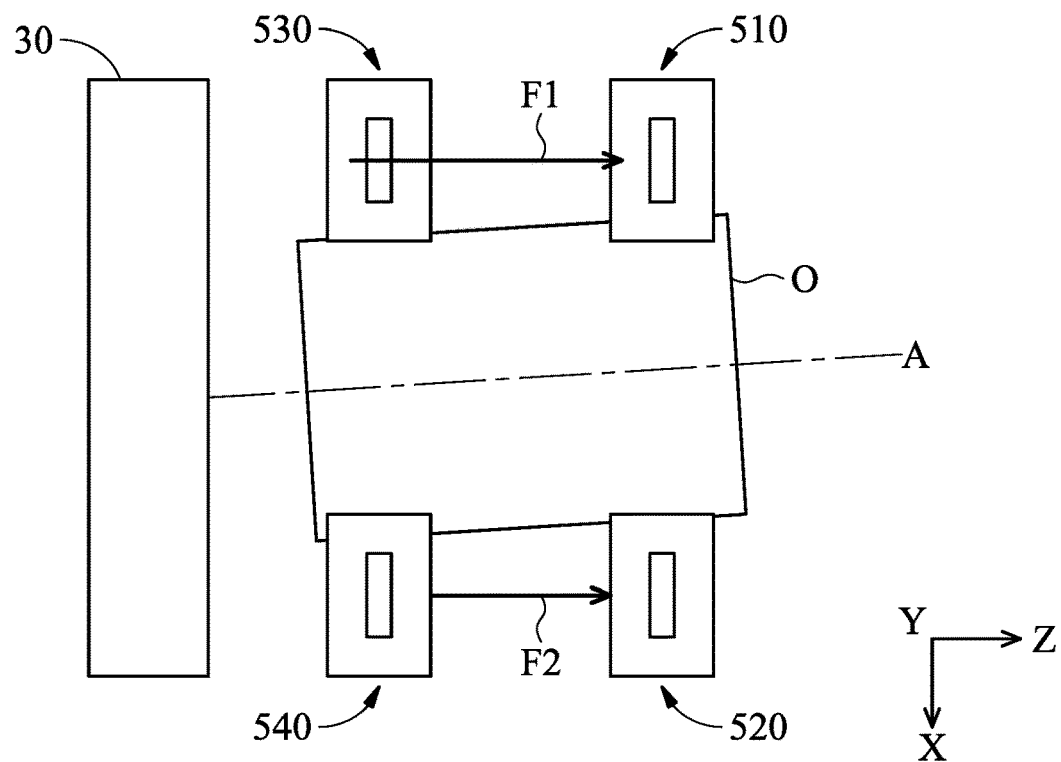
FIGS. 4D and 4E are schematic diagrams representing the driving module driving the optical member to rotate relative to the image sensor according to an embodiment of the invention.
Figure 4E:
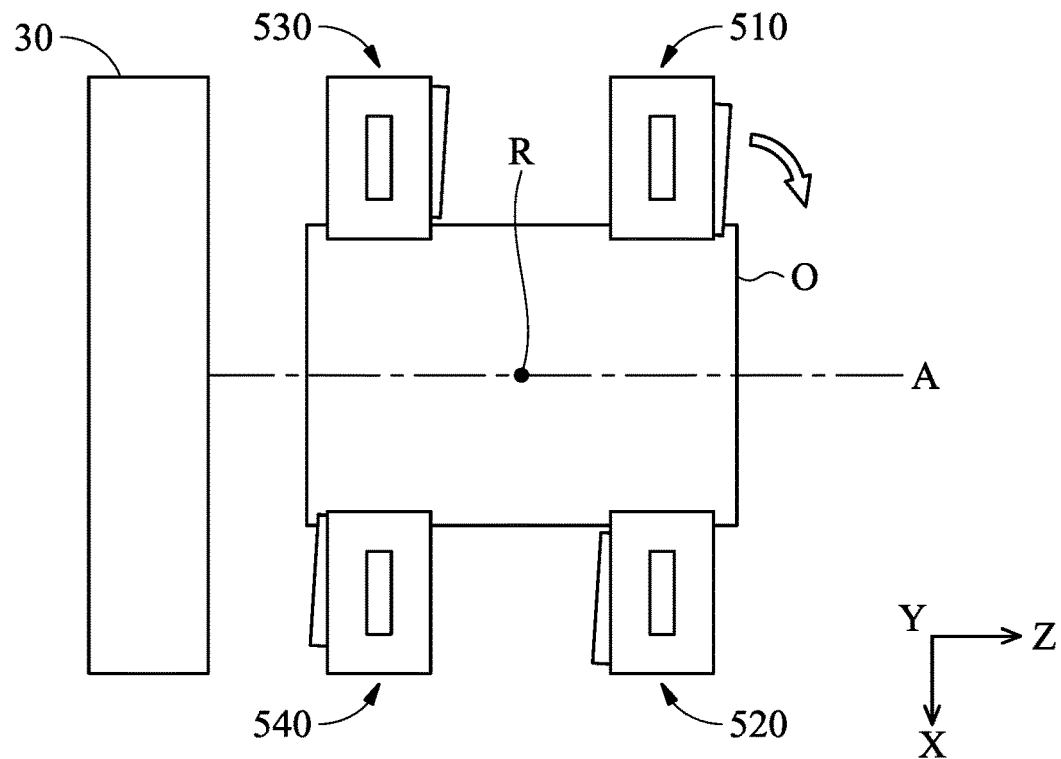

Referring to FIGS. 4D and 4E, when the optical member O is inclined relative to the image sensor 30 (for example, due to mistakes made during assembly or collision of the camera device P), the driving force F1 provided by the first and third electromagnetic driving assemblies 510 and 530 can be different from the driving force F2 provided by the second and fourth electromagnetic driving assemblies 520 and 540. Consequently, the movable portion 100 and the optical member O can rotate around a rotating axis R, and the optical axis A can be perpendicular to the image sensor 30. The rotating axis R is perpendicular to the optical A of the optical member O.

In this embodiment, the optical member driving mechanism 40 has a rectangular structure. The first, second, third, and fourth electromagnetic driving assemblies 510, 520, 530 and 540 are respectively adjacent to the four corners of the rectangular structure, so as to provide uniform driving force to the movable portion 100.

Referring to FIGS. 3 and 4A, the fifth electromagnetic driving assembly 550 comprises a fifth electromagnetic driving component 551 and a fifth electromagnetic driving member 552, respectively affixed to the top cover 210 and the holder 110. For example, the fifth electromagnetic driving component 551 can be a magnetic member, and the fifth electromagnetic driving member 552 can be a driving coil. The line of magnetic force in the fifth electromagnetic driving component 551 is perpendicular to the optical axis A of the optical member O and the rotating axis R. Therefore, when current flows through the fifth electromagnetic driving member 552, electromagnetic effect generated between the fifth electromagnetic driving component 551 and the fifth electromagnetic driving member 552 can provide a driving force, which is perpendicular to the optical axis A, to drive the fifth electromagnetic driving component 551 to move relative to the fifth electromagnetic driving member 552 along an axial direction (X-axis). Consequently, the movable portion 200 can move relative to the fixed portion 100 along the axial direction (X-axis), so as to achieve the purpose of image stabilization. It should be noted that, the axial direction is perpendicular to the optical axis A and the rotating axis R.

Similarly, the sixth electromagnetic driving assembly 560 comprises a sixth electromagnetic driving component 561 and a sixth electromagnetic driving member 562, respectively affixed to the top cover 210 and the holder 110. For example, the sixth electromagnetic driving component 561 can be a magnetic member, and the sixth electromagnetic driving member 562 can be a driving coil. The line of magnetic force in the sixth electromagnetic driving component 561 is perpendicular to the optical axis A of the optical member O and the rotating axis R. Therefore, when current flows through the sixth electromagnetic driving member 562, electromagnetic effect generated between the sixth electromagnetic driving component 561 and the sixth electromagnetic driving member 562 can provide a driving force, which is perpendicular to the optical axis A, to drive the sixth electromagnetic driving component 561 to move relative to the sixth electromagnetic driving member 562 along the axial direction (X-axis). Consequently, the movable portion 200 can move relative to the fixed portion 100 along the axial direction (X-axis), so as to achieve the purpose of image stabilization. The axial direction is perpendicular to the optical axis A and the rotating axis R.

In this embodiment, as observed from the optical axis A of the optical member O, the first, second, third, and fourth electromagnetic driving assemblies 510, 520, 530 and 540 are disposed on a side of the movable portion 100, and the fifth and sixth electromagnetic driving assemblies 550 and 560 are disposed on the other side of the movable portion 100. As observed from the direction (Y-axis) perpendicular to the optical axis A of the optical member O, the first, second, third, and fourth electromagnetic driving assemblies 510, 520, 530 and 540 overlap at least a portion of the optical member O, so as to reduce the dimensions of the whole optical member driving mechanism 40.

As shown in FIGS. 3 and 4A, one of the position-detecting assemblies 600 is disposed between the first electromagnetic driving assembly 510 and the third electromagnetic driving assembly 530, and the other one is disposed between the second electromagnetic driving assembly 520 and the fourth electromagnetic driving assembly 540. Each position-detecting assembly 600 comprise a detector 610 and the sensing object 620 corresponding to each other. The detector 610 is disposed on the circuit board 230, and the sensing object 620 is disposed on the holder 110.

The detector 610 can determine the position of the movable portion 200 relative to the fixed portion 100 by detecting the movement of the sensing object 620. For example, the detector 610 can be a Hall sensor, a magnetoresistance effect sensor (MR sensor), a giant magnetoresistance effect sensor (GMR sensor), a tunneling magnetoresistance effect sensor (TMR sensor), or a fluxgate sensor, and the sensing object 620 can be a magnet.

In this embodiment, the line of magnetic force in one of the sensing object 620 is parallel to the optical axis A of the optical member O. The position-detecting assembly 600 having this sensing object 620 can detect the position of the movable portion 200 relative to the fixed portion 100 in Z-axis. The line of magnetic force in the other sensing object 620 is perpendicular to the optical axis A of the optical member O. The position-detecting assembly 600 having this sensing object 620 can detect the position of the movable portion 200 relative to the fixed portion 100 in X-axis and/or Y-axis. That is, the angular variation of the movable portion 200 relative to the fixed portion 100 can be obtained by the position-detecting assemblies 600.

In some embodiments, the optical member driving mechanism 40 can comprise only one position-detecting assembly 600, wherein this position-detecting assembly 600 can detect the angular variation between the detector 610 and the sensing object 620.

Since the first, second, third, and fourth electromagnetic driving assemblies 510, 520, 530 and 540 can drive the optical member O to rotate relative to the image sensor, the fifth electromagnetic driving assembly 550 and the sixth electromagnetic driving assembly 560 can be omitted in some embodiments, and the purpose of image stabilization can be achieved by rotating. Therefore, the thickness of the optical member driving mechanism 40 in Y-axis is reduced, and the miniaturization of the camera device P and the electronic device E is facilitated.

Figure 5A:
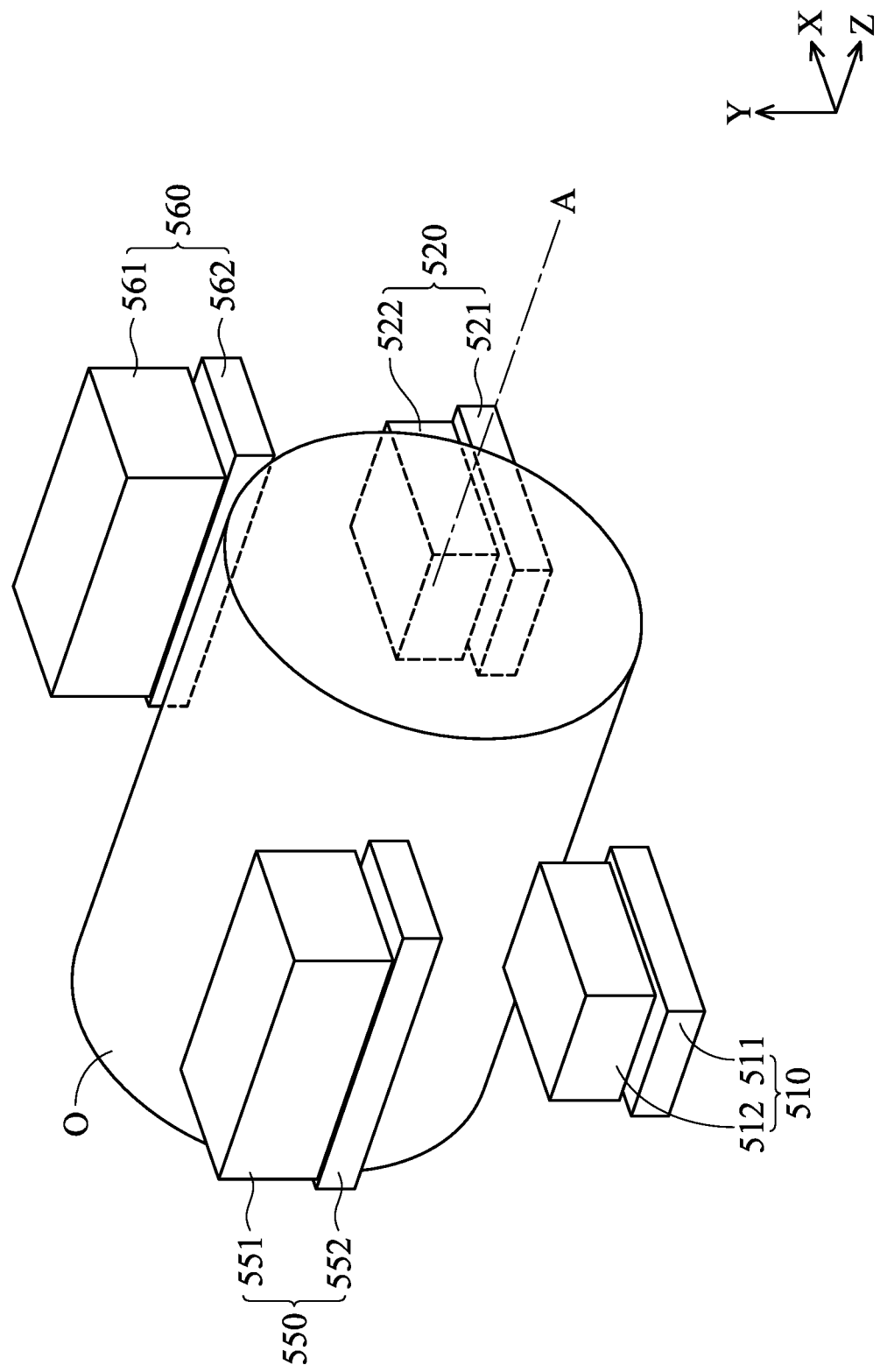
FIG. 5A is a schematic diagram of an optical member and a driving module according to another embodiment of the invention.
Figure 5B:
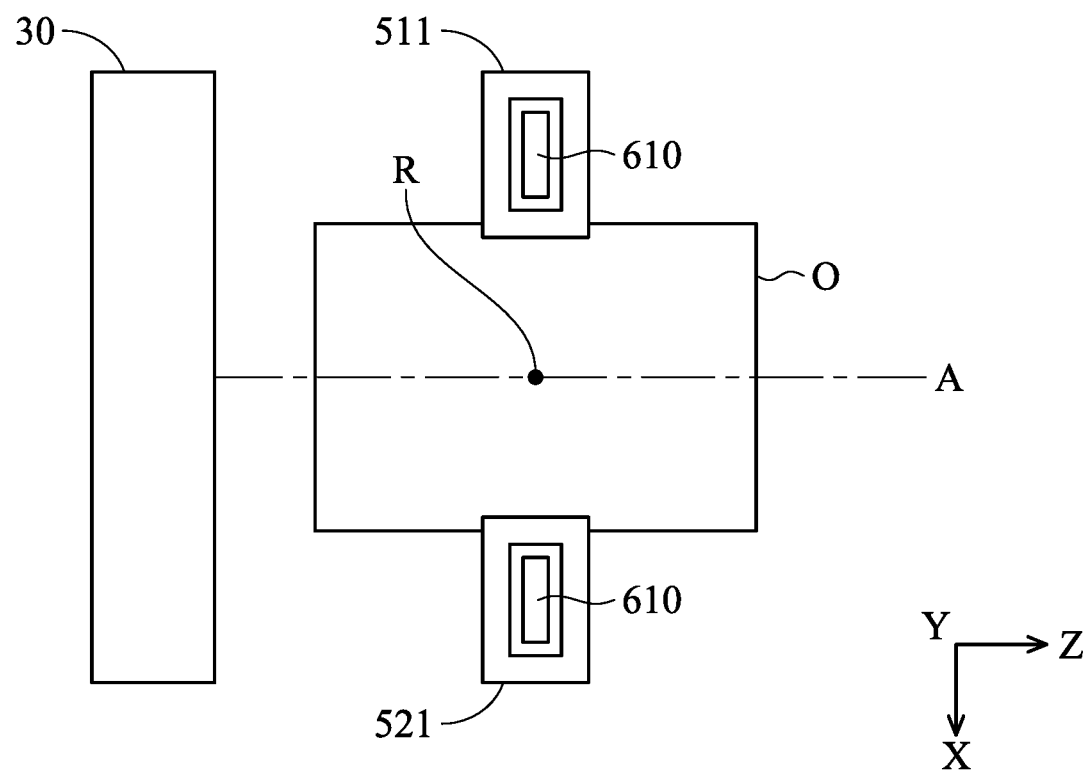
FIG. 5B is a schematic diagram of the optical member, the driving module, a position-detecting assembly, and an image sensor according to another embodiment of the invention.

Referring to FIGS. 5A and 5B, in another embodiment, the optical member driving mechanism 40 omits the third electromagnetic driving assembly 530 and the fourth electromagnetic driving assembly 540. The movable portion 200 can move along Z-axis and rotate around the rotating axis R relative to the fixed portion 100 by merely using the driving force provided from the first electromagnetic driving assembly 510 and the second electromagnetic driving assembly 520. It should be noted that, in this embodiment, each position-detecting assembly 600 merely comprises a detector 610 surrounded by the driving coil (the first electromagnetic driving component 511 and the second electromagnetic driving component 521). The first electromagnetic driving member 512 and the second electromagnetic driving member 522 can be formed as a sensing object which the detector 610 can detect its movement.

Referring to FIGS. 6A-6D, in another embodiment, the fifth electromagnetic driving assembly 550 comprises a fifth electromagnetic driving component 551 and two fifth electromagnetic driving members 552' and 552", and the sixth electromagnetic driving assembly 560 comprises a sixth electromagnetic driving component 561 and two sixth electromagnetic driving members 562' and 562" (the structures of the first, second, third, and fourth electromagnetic assemblies 510, 520, 530 and 540 is the same as that in the aforementioned embodiment, so that the features thereof are not repeated in the interest of brevity).

Two fifth electromagnetic driving members 552' and 552" are arranged along the optical axis A, and two sixth electromagnetic driving members 562' and 562" are arranged along the optical axis A. In the X-axis, the fifth electromagnetic driving members 552' and 552" are respectively aligned with the sixth electromagnetic driving members 562' and 562". It should be noted that the fifth electromagnetic driving member 552' is electrically connected to the sixth electromagnetic driving member 562', the fifth electromagnetic driving member 552" is electrically connected to the sixth electromagnetic driving member 562", and the fifth electromagnetic driving member 552' and the fifth electromagnetic driving member 552" are electrically independent.

Figure 6A:
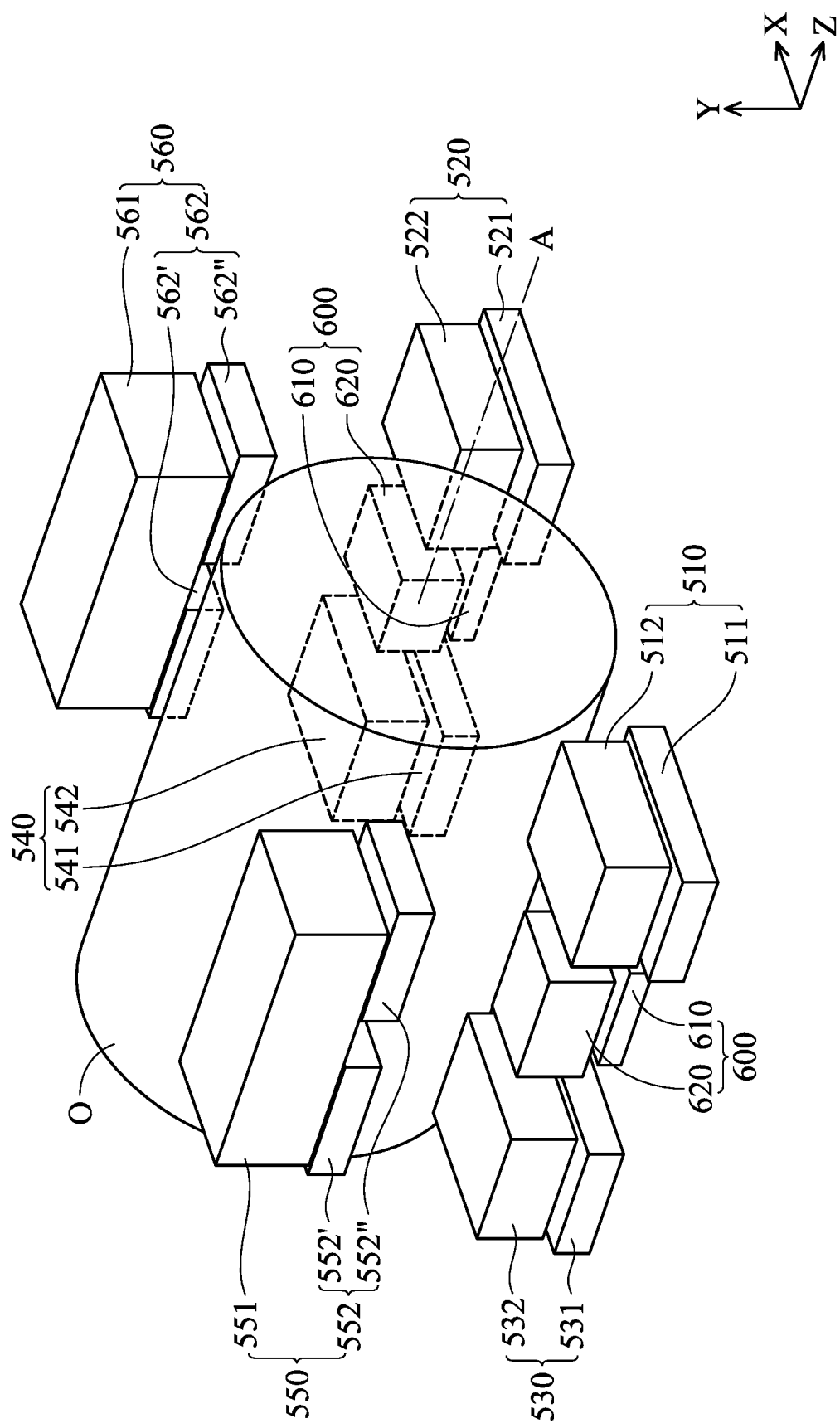
FIG. 6A is a schematic diagram of an optical member, a driving module, and a position-detecting assembly according to another embodiment of the invention.
Figure 6B:
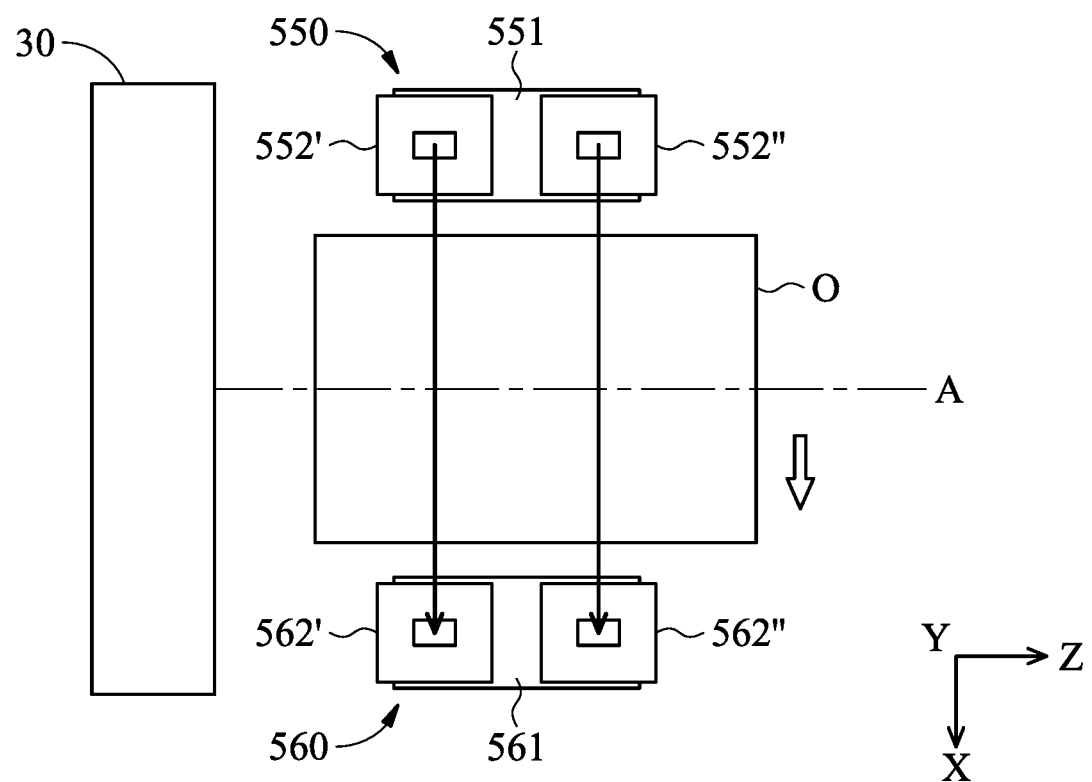
FIG. 6B is a schematic diagram representing the driving module driving the optical member to move relative to the image sensor according to another embodiment of the invention.
Figure 6C:
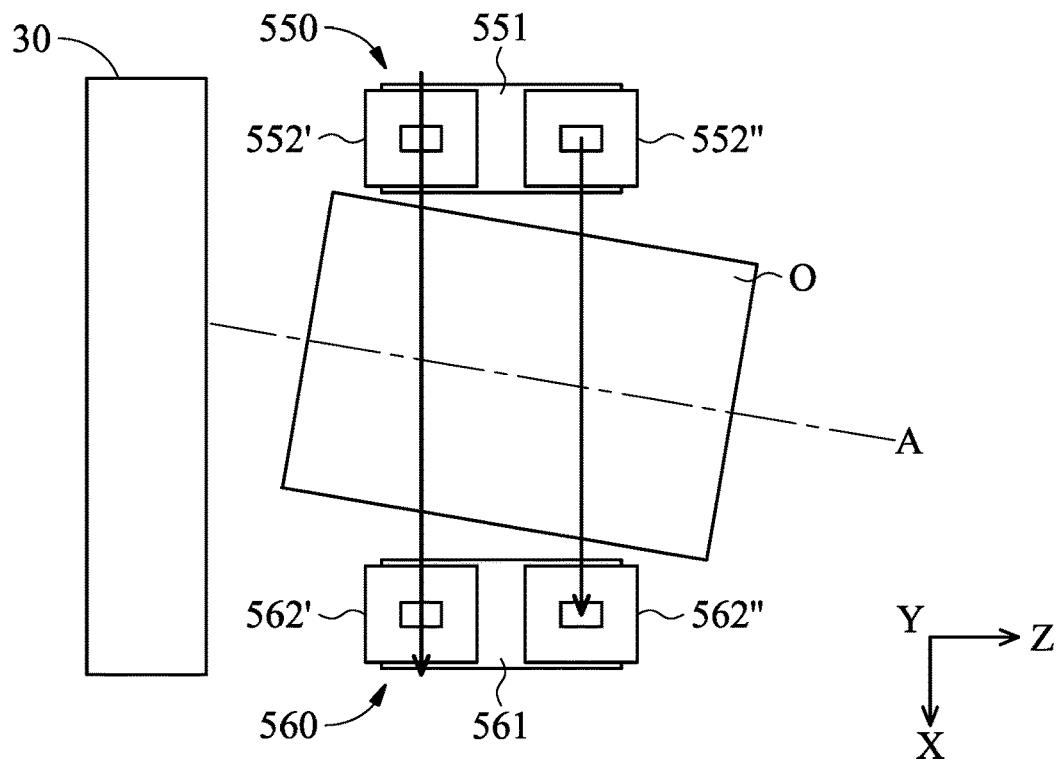
FIGS. 6C and 6D are schematic diagrams representing the driving module driving the optical member to rotate relative to the image sensor according to another embodiment of the invention.
Figure 6D:
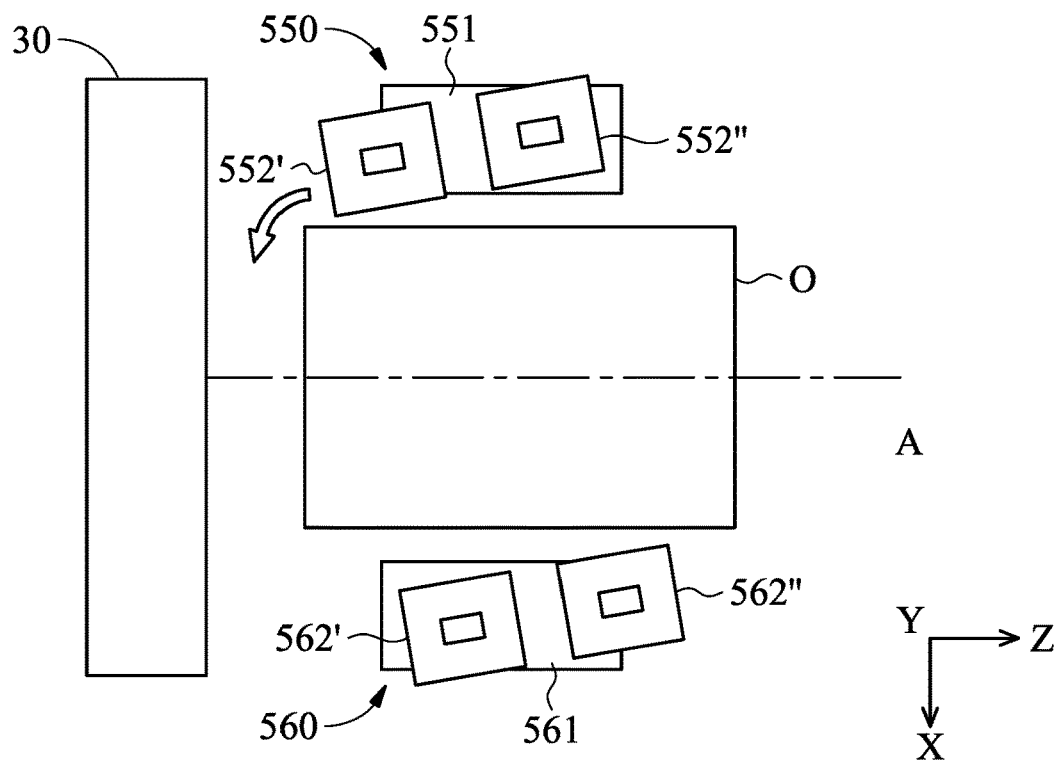

Therefore, by providing the same or different current to the fifth and sixth electromagnetic driving members 552' and 562' and the fifth and sixth electromagnetic driving members 552" and 562", the movable portion 100 and the optical member O can move along X-axis (FIG. 6B) or rotate around the rotating axis R (FIGS. 6C and 6D).

Since the structure comprising two fifth electromagnetic driving members 552' and 552" and two sixth electromagnetic driving members 562' and 562" can rotate the movable portion 100 and the optical member O by supplying different to the fifth and sixth electromagnetic driving members 552' and 562' and the fifth and sixth electromagnetic driving members 552" and 562", the first, second, third, and fourth electromagnetic assemblies 510, 520, 530 and 540 can be incorporated into a single electromagnetic driving assembly or an electromagnetic driving assembly in series in some embodiments.

Figure 7A:
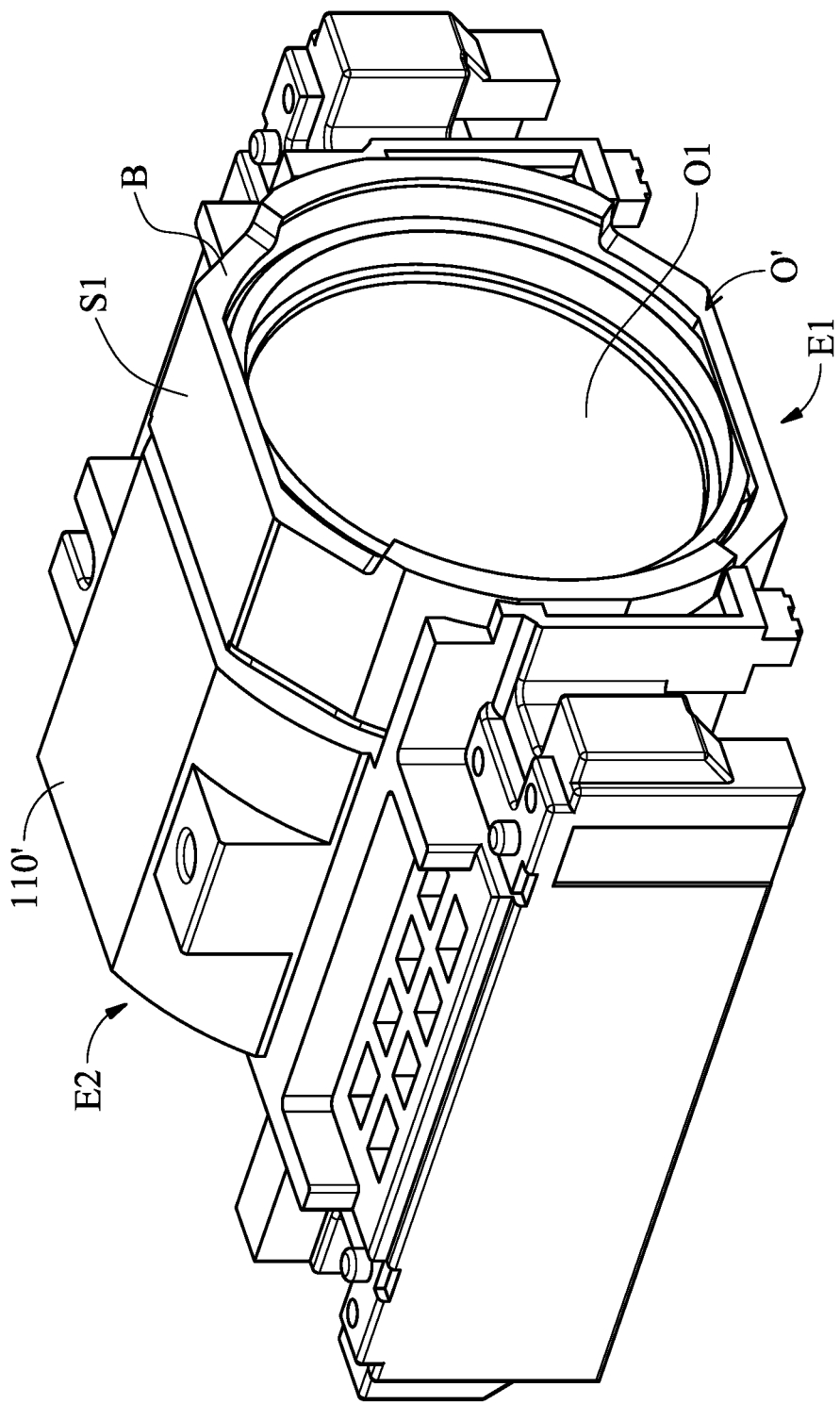
FIGS. 7A-7C are schematic diagrams of a holder and an optical member according to another embodiment of the invention.
Figure 7B:
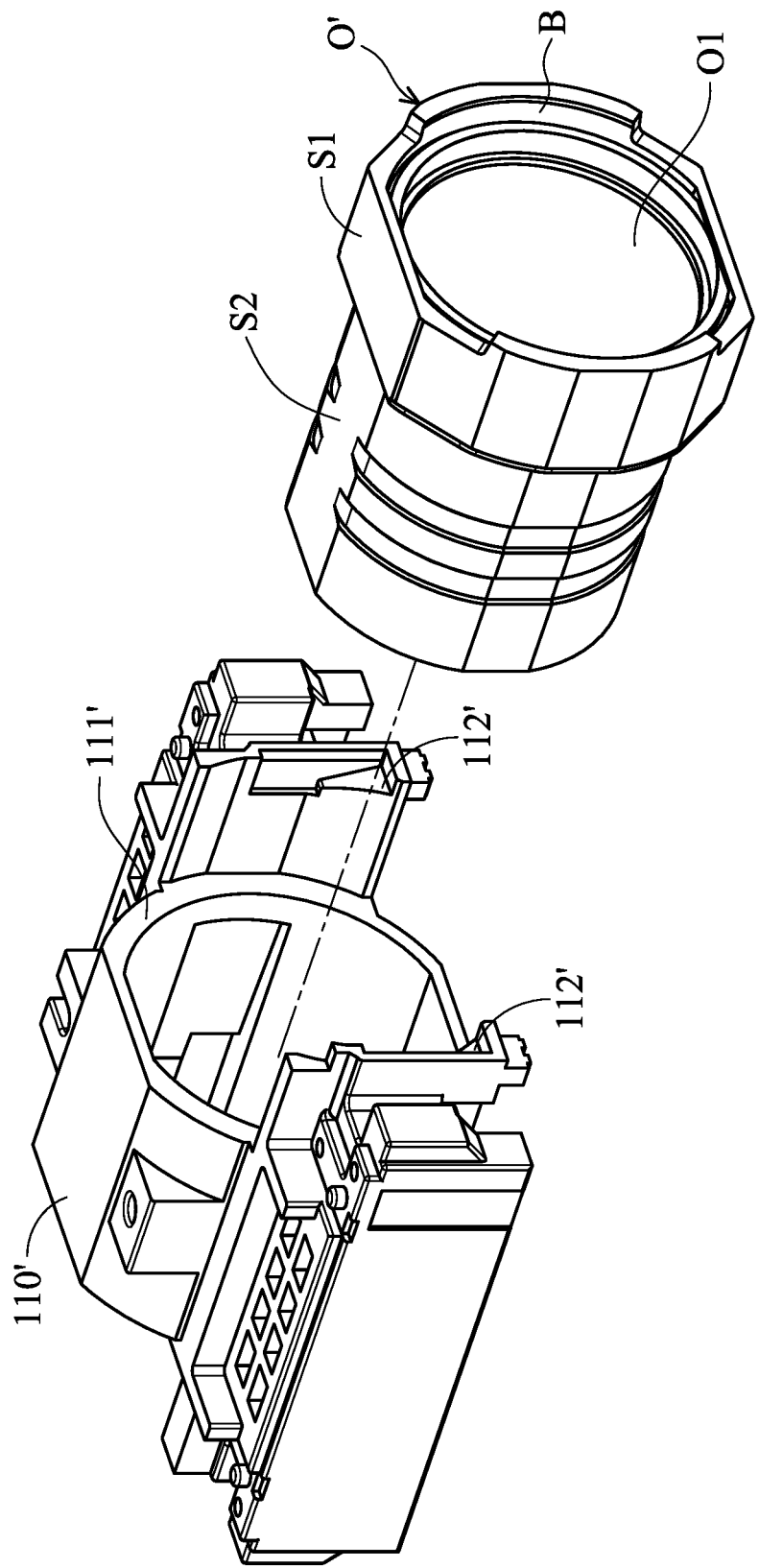
Figure 7C:
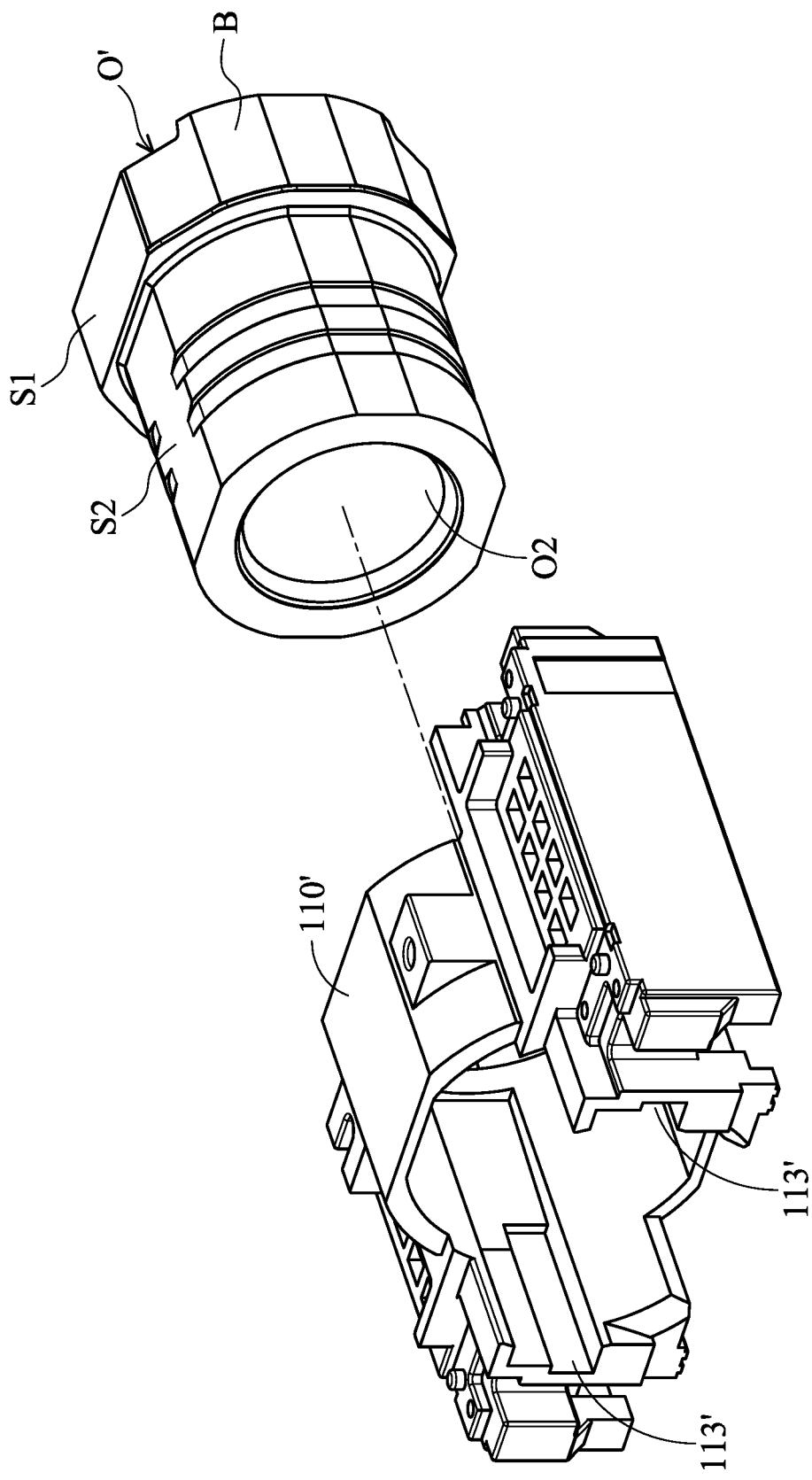

Referring to FIGS. 7A-7C, in another embodiment, the holder 110 in the camera device P can be replaced by the holder 110'. The holder 110' can support the optical member O'. The optical member O' is a camera lens, at least comprising a barrel B, a first optical lens O1 adjacent to a light-entering end E1 and a second optical lens O2 adjacent to a light-emitting end E2, wherein the first and second optical lenses O1 and O2 are disposed in the barrel B. The first optical lens O1 is larger than the second optical lens O2.

As mentioned above, external light propagates into the optical mechanism in the first direction and is reflected by the reflecting element (e.g. the prism 20 in FIG. 2) to propagate through the first and second optical lenses O1 and O2 in the second direction. Specifically, the holder 110' has a surface 111' (FIG. 7B). When the optical member O' is disposed on the holder 110', the surface 111' faces the light-entering end E1 and the first optical lens O1. The holder 110' further comprises a plurality of glue recesses 112' located on opposite sides of the optical member O'. The glue recesses 112' are arranged in a third direction when viewed along the optical axis of the first and second optical lenses O1 and O02, and the first, second, and third directions are not parallel to each other. In this embodiment, the third direction is perpendicular to the first direction and the second direction, and the second direction is parallel to the optical axis of the first and second optical lenses O1 and O2.

It should be noted that the holder 110' has a rectangular structure when viewed along the optical axis of the first and second optical lenses O1 and O2. As shown in FIG. 7B, the holder 110' has two vertical sides (short sides) and two horizontal sides (long sides) when viewed along the optical axis of the first and second optical lenses O1 and O2, wherein the vertical sides are parallel to the first direction, the horizontal sides are perpendicular to the first direction. Here, the glue recess 112' are only formed on the vertical sides (short sides) of the rectangular structure, and no recess is formed on the horizontal sides (long sides) of the rectangular structure for receiving glue.

An adhesive member (e.g. glue) can be filled into the glue recesses 112' to affix the optical member O' to the holder 110'. Furthermore, at least one glue recess 113' is formed on the holder 110'. The glue recess 113' is adjacent to the light-emitting end E2. The adhesive member (e.g. glue) can be also filled into the glue recess 113', so as to make the optical member O' more stable.

As shown in FIGS. 7A-7C, a first flat surface S1 and a second flat surface S2 are formed on the top side of the barrel B. Specifically, the first and second flat surfaces S1 and S2 are situated on different planes and parallel to each other, wherein the first and second optical lenses O1 and O2 define an optical axis parallel to the first and second flat surfaces S1 and S2. When the optical member O' is assembled to the holder 110', the first flat surface S1 is exposed to the outside of the holder 110' (FIG. 7A), and at least a part of the second flat surface S2 is covered by the holder 110'.

In summary, an optical member driving mechanism for driving an optical member is provided, including a fixed portion, a movable portion, and a driving module. The movable portion can support the aforementioned optical member, and the driving module can drive the movable portion to rotate relative to the fixed portion around a rotating axis, wherein the rotating axis is different from the optical axis of the optical member. The driving module includes a first electromagnetic driving assembly and a second electromagnetic driving assembly, and the optical axis is disposed therebetween. The first electromagnetic driving assembly and the second electromagnetic driving assembly are disposed on a side of the movable portion, and electrically independent.

An embodiment of the invention further provides a camera device, including an optical member, a fixed portion, a movable portion, and a driving module. The movable portion can support the optical member, and the driving module can drive the movable portion to move relative to the fixed portion. The optical member has a first optical lens and a second optical lens, wherein the first optical lens is closer to a light-entering end of the optical member than the second optical lens, and the first optical lens is larger than the second optical lens.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An optical mechanism, comprising:
   an optical member, having a first optical lens and a second optical lens, wherein the first and second optical lenses define an optical axis, and the first optical lens is larger than the second optical lens:
   a fixed portion; and
   a holder, movably connected to the fixed portion and configured to support the optical member, wherein the holder has an end surface facing the first optical lens, and the end surface is not parallel to the optical axis.

2. The optical mechanism as claimed in claim 1, the end surface and the first optical lens at least partially overlap when view along the optical axis.

3. The optical mechanism as claimed in claim 1, wherein the end surface and the second optical lens do not overlap when view along the optical axis.

4. The optical mechanism as claimed in claim 1, further comprising a reflecting element, wherein light propagates into the optical mechanism in a first direction and is reflected by the reflecting element to propagate through the first and second optical lenses in a second direction.

5. The optical mechanism as claimed in claim 4, wherein the first optical lens is closer to the reflecting element than the second optical lens.

6. The optical mechanism as claimed in claim 4, wherein the holder has a plurality of glue recesses, and the glue recesses are arranged in a third direction when viewed along the optical axis, wherein the first, second, and third directions are not parallel to each other.

7. The optical mechanism as claimed in claim 6, wherein the third direction is perpendicular to the first direction and the second direction, and the second direction is parallel to the optical axis.

8. The optical mechanism as claimed in claim 1, wherein the holder has a rectangular structure when viewed along the optical axis, and the rectangular structure has two vertical sides and two horizontal sides, wherein the vertical sides are parallel to the first direction, and at least a glue recess is formed on one of the vertical sides of the rectangular structure.

9. The optical mechanism as claimed in claim 8, wherein two glue recess are respectively formed on the two vertical sides of the rectangular structure.

10. The optical mechanism as claimed in claim 9, wherein no recess is formed on the horizontal sides of the rectangular structure for receiving glue.

11. The optical mechanism as claimed in claim 4, wherein the optical member further has a barrel, and the first and second optical lenses are disposed in the barrel.

12. The optical mechanism as claimed in claim 11, wherein the barrel has a first flat surface and a second flat surface situated on different planes and parallel to each other, and the first and second flat surfaces are located on the same side of the barrel.

13. The optical mechanism as claimed in claim 11, wherein the fixed portion has a lower cover, a top cover, and a circuit board, and the holder is accommodated in the fixed portion, wherein the top cover and the lower cover are assembled to each other and form a hollow box, and the circuit board is disposed on the lower cover.

14. The optical mechanism as claimed in claim 13, further comprising:
   two sensing objects, disposed on the holder; and
   two detectors, disposed on the circuit board and respectively detecting the movement of the sensing objects;
   wherein when viewed along the first direction, the first and second sensing objects are located on opposite sides of the optical axis.

15. The optical mechanism as claimed in claim 14, wherein the sensing objects at least partially overlap the detectors when view along the first direction.

16. The optical mechanism as claimed in claim 13, further comprising a housing, wherein the optical member, the fixed portion, and the holder are accommodated in the housing.

17. The optical mechanism as claimed in claim 16, further comprising a plurality of elastic members connected to the holder and the hollow box to hang the holder in the hollow box.

18. The optical mechanism as claimed in claim 17, wherein when viewed along the first direction, the elastic members are located at different corners of the lower cover.

19. The optical mechanism as claimed in claim 18, further comprising a plurality of suspension wires respectively connecting the elastic members to the circuit board.

20. The optical mechanism as claimed in claim 19, wherein the elastic members and the suspension wires comprise metal.

* * * * *